(No Model.)
T. J. LEARY.
STEAM CULINARY VESSEL.
No. 355,328. Patented Jan. 4, 1887.
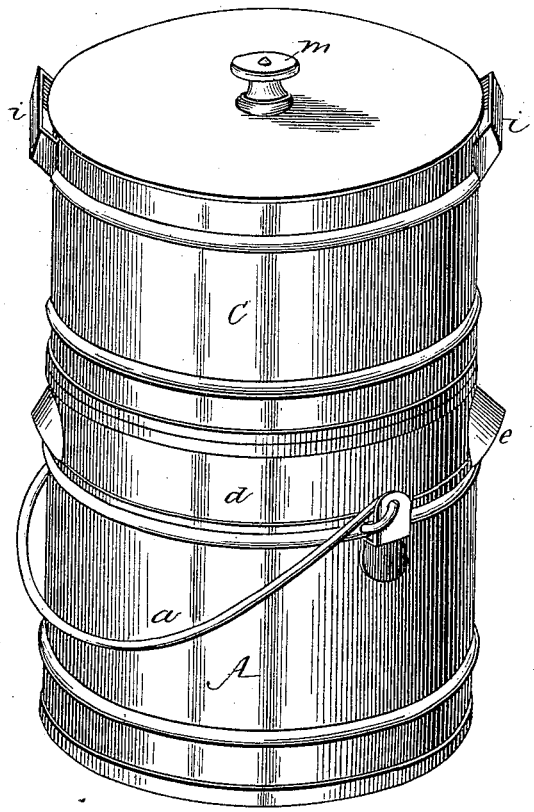
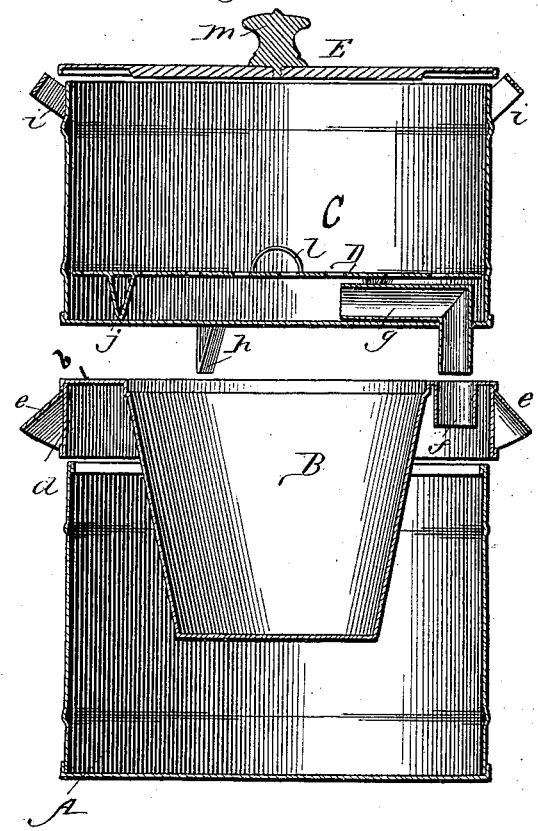
Witnesses.
W. Rossiter
Anton Schoeningh
Inventor.
Thomas J. Leary
By Wm H Lotz
Atty.

UNITED STATES PATENT OFFICE.

THOMAS J. LEARY, OF CHICAGO, ILLINOIS.

STEAM CULINARY VESSEL.

SPECIFICATION forming part of Letters Patent No. 355,323, dated January 4, 1887.

Application filed February 23, 1886. Serial No. 192,838. (No model.)

*To all whom it may concern:*

Be it known that I, THOMAS J. LEARY, a citizen of the United States of America, residing at Chicago, (Town of Lake,) in the county of Cook and State of Illinois, have invented certain new and useful Improvements in Steam Culinary Vessels, of which the following is a specification, reference being had therein to the accompanying drawings.

The object I have in view is to produce steam culinary vessels in which, for the purpose of easier handling, of better inspection, and more thorough cleansing, the cooking vessel inserted into the water-boiler is made detachable therefrom, and that provides a steam-circulation from such water-boiler into a second cooking vessel placed on top thereof.

My invention therefore consists in the peculiar novel construction of such vessels and in their arrangement relative to each other, all as will be hereinafter fully described and specifically claimed.

In the accompanying drawings, Figure 1 represents a perspective view of two cooking vessels, one placed on top of the other; and Fig. 2 a vertical cross section of the parts separated and showing their connections.

Corresponding letters in the several figures of the drawings designate like parts.

A denotes the water-boiler, provided with bail $a$, and B the cooking vessel, consisting of a kettle having to its upper edge a horizontal annular flange, $b$, to the outer edge of which is again secured a cylindrical flange, $d$, which latter is sufficiently larger in diameter than the water-boiler to pass over the upper edge of the same and form a close joint therewith, so as to be readily taken apart and put together again. To flange $d$ are secured at diametrically-opposite sides ear-handles $e$, and through flange $b$ is cut a hole provided with a nozzle, $f$, that extends downward.

C is another cylindrical cooking-vessel of equal diameter with boiler A and with a flat bottom. One shank of an L-shaped tube, $g$, is secured upon the bottom of vessel C, the other shank of which being projected through such bottom to enter nozzle $f$ and form a close joint therewith. For the purpose of guiding and holding vessel C vertically in line with vessels A and B, two V-shaped legs, $h$, are secured under the bottom of boiler C, that will bear against the inside face of kettle B, and these legs, being of the same length, as the projecting portion of tube $g$ and at equal distances from it and each other, the legs and tube will form the feet for the vessel to stand upon when detached. The vessel C is also provided with ear-handles $i$, secured to its upper edge at diametrically-opposite points.

D is a detachable false bottom, perforated and provided with legs $j$, for supporting it at proper elevation above the bottom of vessel C, and with handle $l$, for removing it.

E is the cover, that will fit upon either one of the vessels A, B, or C, and which is provided with a knob-handle, $m$.

The vessel A being partly filled with water, and the vessel B being inserted therein, with its flange $d$ overlapping the rim of vessel A, meat or other food to be cooked is placed therein, and then the vessel C is placed upon vessel B, to form a cover thereto, with its tube $g$ inserted into nozzle $f$. This vessel C is particularly intended for boiling potatoes or for cooking other vegetables, which for that purpose are placed upon perforated bottom D. The vessel A being placed over the fire, the water therein will boil and will cook the meat in vessel B, that it surrounds, while the steam generated from such water will enter vessel C through tube $g$, and will circulate through the potatoes or other vegetables therein, cooking the same, and the water of condensation will run back into vessel A through tube $g$. After the cooking is completed the vessel C is removed, and then the vessel B is lifted out of boiler A, when the hot water in such boiler may be used for boiling eggs or for washing dishes, after which such boiler or vessel can be thoroughly cleaned to be in condition for future use.

The vessels A and B alone can be used for cooking by placing cover E thereon, or a third cooking vessel may be placed upon vessel C, that would be heated by the steam circulating through such vessel C and coming in contact with the bottom of such third vessel.

What I claim is—

1. The combination, with the boiler A, of cooking-vessel B, provided with flat annular flange $b$, resting upon the upper edge of the boiler, and the flange $d$, surrounding said boiler, as set forth.

2. The combination, with a steam culinary vessel consisting of parts A and B, detachably connected and having nozzle $f$, of vessel C, provided with L-shaped tube $g$ and legs $h$, substantially as and for the purpose set forth.

In testimony whereof I affix my signature in presence of two witnesses.

THOMAS J. LEARY.

Witnesses:
ANTON SCHOENINGER,
R. F. SAYERS.

It is hereby certified that the name of the patentee in Letters Patent No. 355,328, granted January 4, 1887, for an improvement in "Steam Culinary Vessels," was erroneously written and printed "Thomas J. Leary," whereas said name should have been written and printed *Thomas J. Leavy;* and that said Letters Patent should be read with this correction therein that the same may conform to the record of the case in the Patent Office.

Signed, countersigned, and sealed this 25th day of January, A. D. 1887.

[SEAL.]

D. L. HAWKINS,
*Acting Secretary of the Interior.*

Countersigned:
    R. B. VANCE,
        *Acting Commissioner of Patents.*